(12) United States Patent
Kasturi et al.

(10) Patent No.: US 7,734,810 B2
(45) Date of Patent: Jun. 8, 2010

(54) OPTIMIZATIONS FOR TCP CONNECTION SETUP AND TEARDOWN

(75) Inventors: Rohini Kasturi, Livermore, CA (US); Alpesh S. Patel, Pleasanton, CA (US); Sravan Vadlakonda, Sunnyvale, CA (US); Kenneth Durazzo, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 337 days.

(21) Appl. No.: 11/818,081

(22) Filed: Jun. 12, 2007

(65) Prior Publication Data

US 2008/0313347 A1    Dec. 18, 2008

(51) Int. Cl.
G06F 15/16 (2006.01)
(52) U.S. Cl. .................................. 709/237; 709/227
(58) Field of Classification Search .............. 709/227, 709/237
See application file for complete search history.

(56) References Cited

U.S. PATENT DOCUMENTS

| | | | |
|---|---|---|---|
| 6,963,921 B1 | 11/2005 | Yang et al. | |
| 6,967,956 B1 * | 11/2005 | Tinsley et al. | 370/466 |
| 7,051,109 B1 | 5/2006 | Stewart et al. | |
| 7,054,333 B2 * | 5/2006 | Martinez et al. | 370/469 |
| 7,058,058 B2 | 6/2006 | Singh et al. | |
| 7,089,312 B2 * | 8/2006 | Liu et al. | 709/227 |
| 7,103,037 B2 * | 9/2006 | Roque et al. | 370/356 |
| 7,158,522 B1 | 1/2007 | Singh et al. | |
| 2006/0179147 A1 * | 8/2006 | Tran et al. | 709/227 |
| 2008/0205445 A1 * | 8/2008 | Kumar et al. | 370/469 |

OTHER PUBLICATIONS

Kumar et al., "Optimizing TCP Traffic via an SCTP Association" U.S. Appl. No. 11/711,959 filed Feb. 28, 2007 (24 pages).

* cited by examiner

*Primary Examiner*—Moustafa M Meky
*Assistant Examiner*—Sargon N Nano
(74) *Attorney, Agent, or Firm*—Weaver Austin Villeneuve & Sampson LLP (57) ABSTRACT

In one embodiment, a first network device receives a control message in a first protocol from a client, the control message in the first protocol being addressed to a second network device. The first network device identifies an existing connection in a second protocol that is associated with the second network device. The first network device establishes a connection in the first protocol with the client according to a status of the existing connection in the second protocol that is associated with the second network device.

19 Claims, 7 Drawing Sheets

OPTIMIZATIONS FOR TCP CONNECTION SETUP AND TEARDOWN

BACKGROUND

1. Technical Field

The present disclosure relates generally to methods and apparatus for establishing a network connection.

2. Description of the Related Art

Network connections are often time consuming to establish. More particularly, protocols such as TCP typically require that specific control messages be sent and acknowledged before a network connection can be established. As a result, connection establishment is delayed.

Moreover, network bandwidth is consumed by the control messages that are transmitted to establish these network connections. Similarly, network bandwidth is consumed by the control messages that are transmitted to tear down an established connection. Accordingly, valuable bandwidth is consumed to transmit these control messages.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

Overview

In one embodiment, a first network device receives a control message in a first protocol from a client, the control message in the first protocol being addressed to a second network device (e.g., server or host). The first network device identifies an existing connection in a second protocol that is associated with the second network device. The first network device establishes a connection in the first protocol with the client according to a status of the existing connection in the second protocol that is associated with the second network device.

Specific Example Embodiments

In the following description, the example embodiments describe establishing a connection between a source device and a destination device. In these examples, the source device is a client and the destination device is a server. However, it is important to note that the source and destination devices may be other types of devices. For instance, the destination device may be another client, rather than a server.

Figure 1:
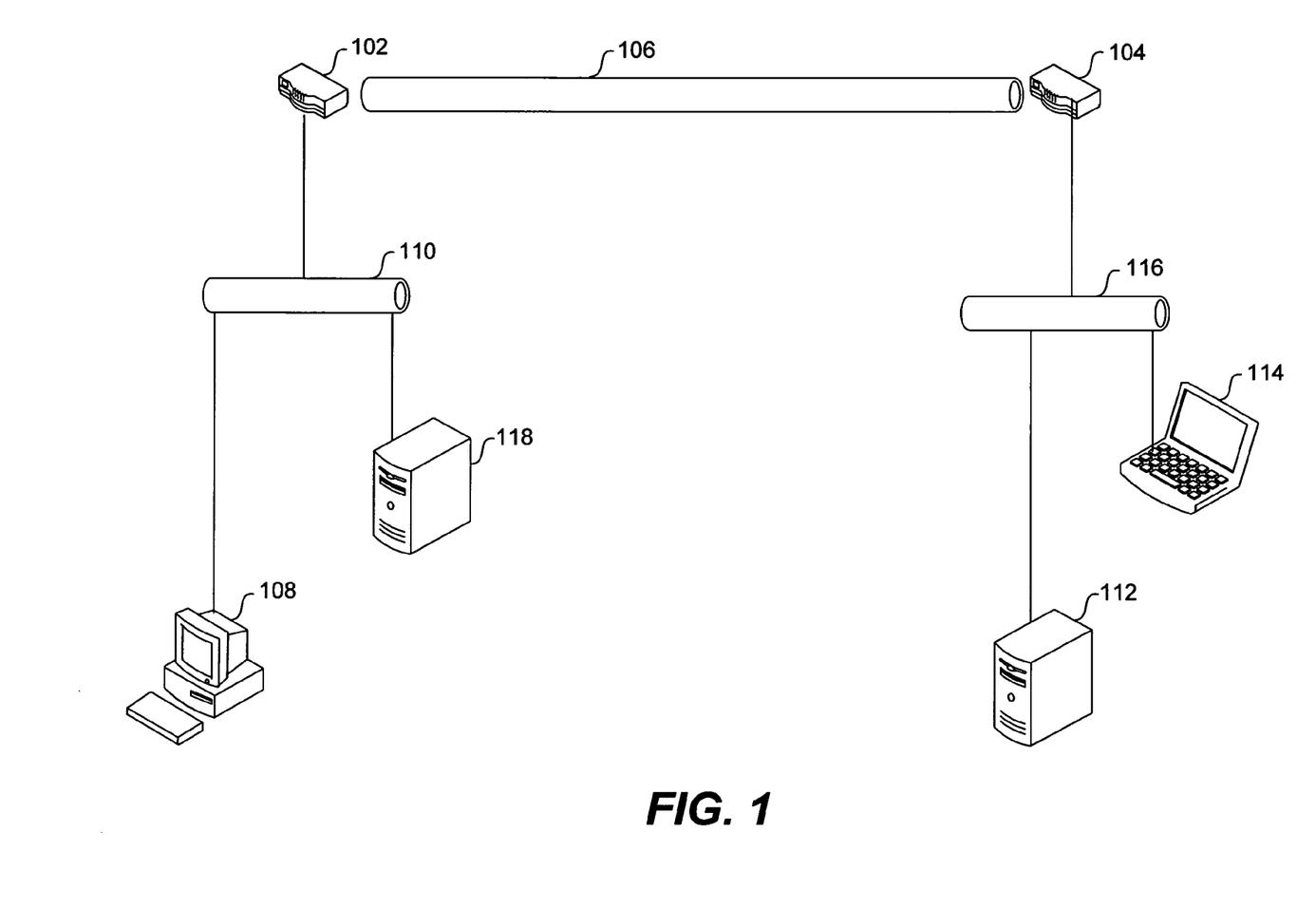
FIG. 1 is a diagram illustrating an example system.

FIG. 1 is a diagram illustrating an example system. A first network device 102 may be coupled to a second network device 104 over a network link such as a Wide Area Network (WAN) link 106. The first network device 102 may be a router associated with a first local area network (LAN), while the second network device 104 may be a router associated with a second local area network. For example, the first network device 102 may be associated with a branch office of a company, while the second network device 104 may be a router associated with a head office of the same company.

A user may connect to the branch office via a client computer 108 that is coupled to the first network device 102 via a LAN link 110. The user may wish to communicate with a server 112 that is coupled to the head office via the second network device 104. In order to communicate with the server 112 over the WAN link 106, a network connection in a first protocol such as Transmission Control Protocol (TCP) may be established between the client 108 and the first network device 102.

Once a TCP connection arrives from the client 108, the first network device 102 may then select a network connection in a second protocol such as the Stream Control Transmission Protocol (SCTP) between the first network device 102 and the second network device 104. Now the second network device 104 establishes a new TCP connection to the server 112. Once the connection has been successfully established between the second network device 104 and the server 112, only then may the TCP connection between the client 108 and the first network device 102 be established. Unfortunately, it may take a significant amount of time for the TCP connection to be established.

Similarly, a user may connect to the head office via a client computer 114 that is coupled to the second network device 104 via a LAN link 116. The user may wish to communicate with a server 118 that is coupled to the branch office via the first network device 102. In order to communicate with the server 118 over the WAN link 106, a network connection in a first protocol such as TCP may be established between the client 114 and the second network device 104. Once the TCP connection is established, the second network device 104 may establish a network connection in a second protocol such as SCTP between the second network device 104 and the server 118. If the second network device 104 waits for the TCP connection to be established before initiating the SCTP connection, a significant time delay is introduced.

In the following examples, a client at a branch office attempts to connect to a server at a head office. However, it is also important to note that a client at the head office may also attempt to connect to a server at the branch office. Thus, a client in one LAN may connect to a server in another LAN via a WAN link in accordance with the disclosed embodiments. Of course, it is also possible that both the client and the server are located in the same network.

It is also important to note that the example embodiments are described with reference to the TCP and SCTP protocols. However, it is also possible that other combinations of protocols may be used to establish the corresponding network connections.

Figure 2:
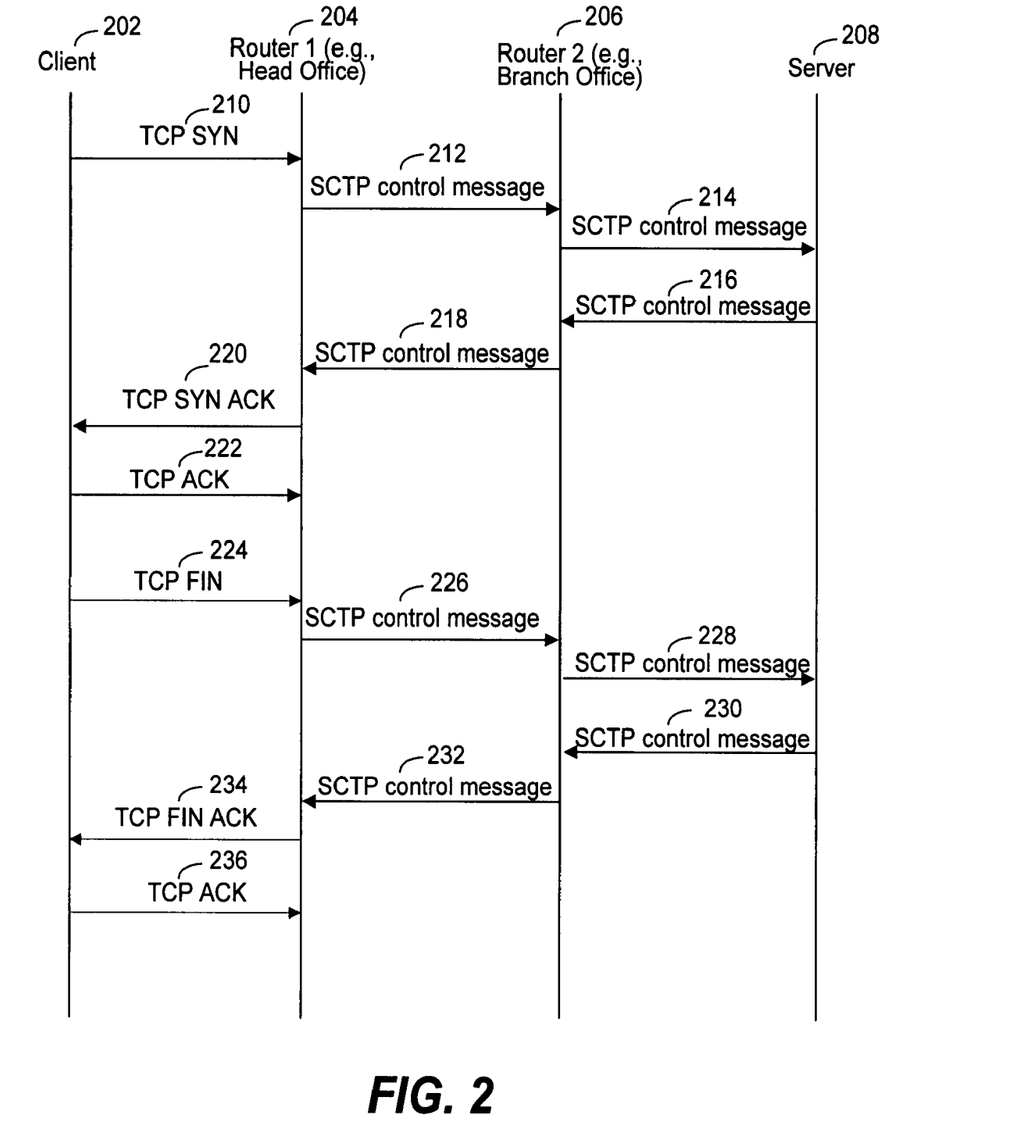
FIG. 2 is a transaction flow diagram illustrating a method of performing SCTP encapsulation.

FIG. 2 is a transaction flow diagram illustrating a method of performing SCTP encapsulation. Steps performed by a client 202, a first router 204 (e.g., located at a head office), a second router 206 (e.g., located at a branch office), and a server 208 are represented by corresponding vertical lines, as shown. As shown in this example, the second router 206 may be a remote peer that sits in the data path of the server 208. In order to initiate a TCP connection, client 202 sends a TCP SYN packet at 210. In this example, each TCP connection is associated with an existing SCTP connection. Upon receiving the TCP SYN packet, the first router 204 sends an SCTP control message at 212 to the second router 206 to establish an SCTP stream associated with the SCTP connection Of course, it is also possible that the SCTP stream may be established prior to receiving the TCP SYN packet. The second router 206 sends the SCTP control message at 214 to the server 208. The server 208 responds by sending an SCTP control message at 216 to the second router 206, which sends the SCTP control message at 218 to the first router 204. In the example shown in FIG. 2, the first router 204 waits until it receives the SCTP control message at 218 to send a TCP SYN ACK to the client at 220. The client then responds with a TCP ACK at 222 to the first router 204. As a result, the TCP connection is not established until it is confirmed that the SCTP stream has been established. Unfortunately, this introduces a substantial delay into the establishment of the TCP connection.

Similarly, when the client 202 wishes to end the TCP connection, the client 202 sends a TCP FIN packet at 224 to the first router 204. The first router 204 sends an SCTP control message at 226 to the second router 206 to end the SCTP connection. The second router 206 sends the SCTP control message to the server 208 at 228. The server 208 responds by sending an SCTP control message at 230 to the second router 206, which sends the SCTP control message at 232 to the first router 204. In the example shown in FIG. 2, the first router 204 waits until it receives the SCTP control message at 232 to send a TCP FIN ACK to the client at 234. The client then responds with a TCP ACK at 236 to the first router 204. As a result, the TCP connection is not discontinued until it is confirmed that the corresponding SCTP session has ended.

Figure 3:
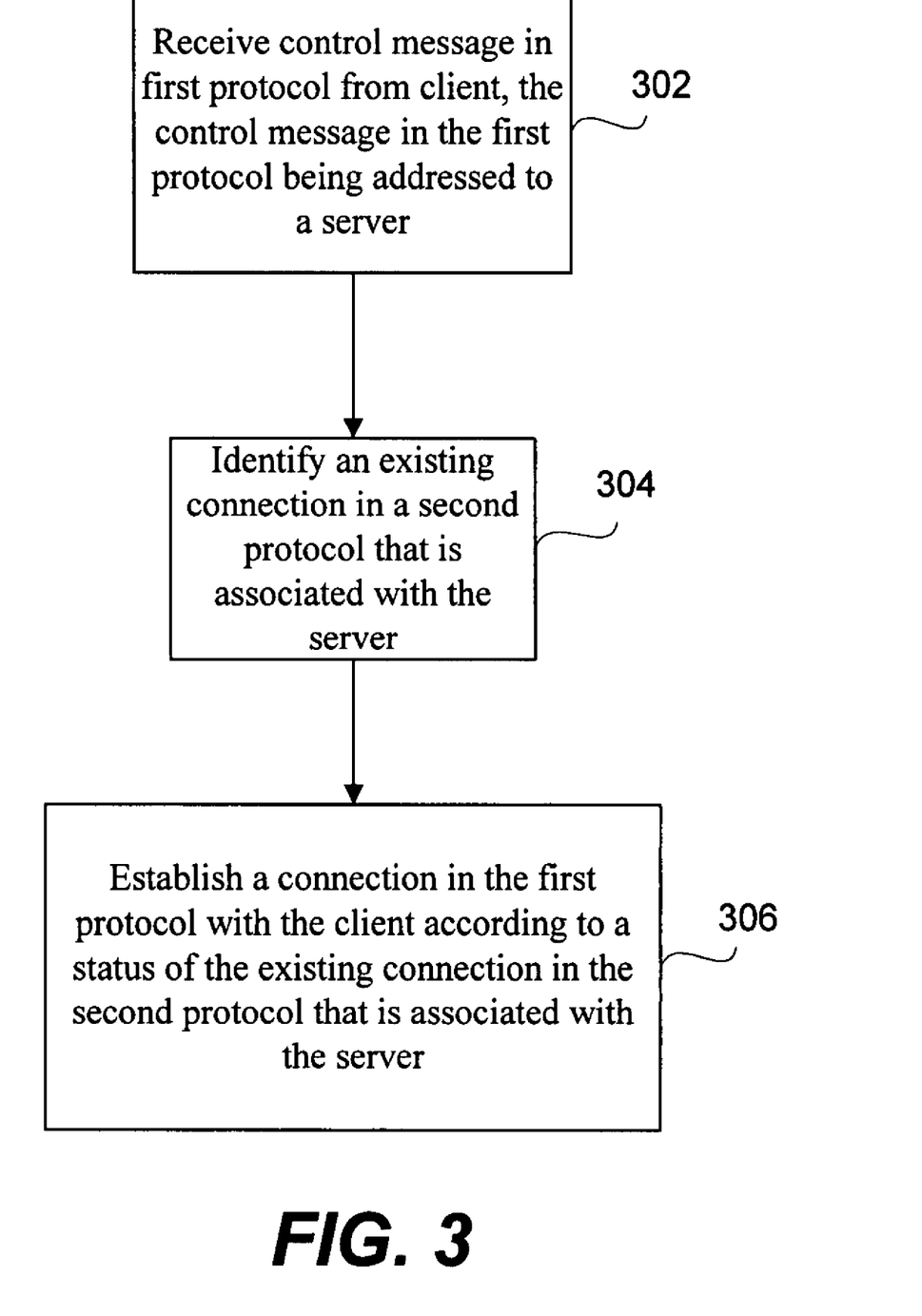
FIG. 3 is a process flow diagram illustrating an example method of establishing a network connection in association with an existing network connection.

In accordance with one embodiment, a network connection in a first protocol is associated with an existing network connection in a second protocol. FIG. 3 is a process flow diagram illustrating an example method of establishing a network connection in association with an existing network connection. A network device receives a control message in first protocol from client at 302, the control message in the first protocol being addressed to a server. The network device identifies an existing connection in a second protocol that is associated with the server at 304. The network device establishes a connection in the first protocol with the client according to a status of the existing connection in the second protocol that is associated with the server at 306, as will be described in further detail below with reference to FIGS. 4-6. In this manner, a TCP session may be terminated and encapsulated in SCTP by a network device that sit in the data communications path between the client and the server.

Figure 4:
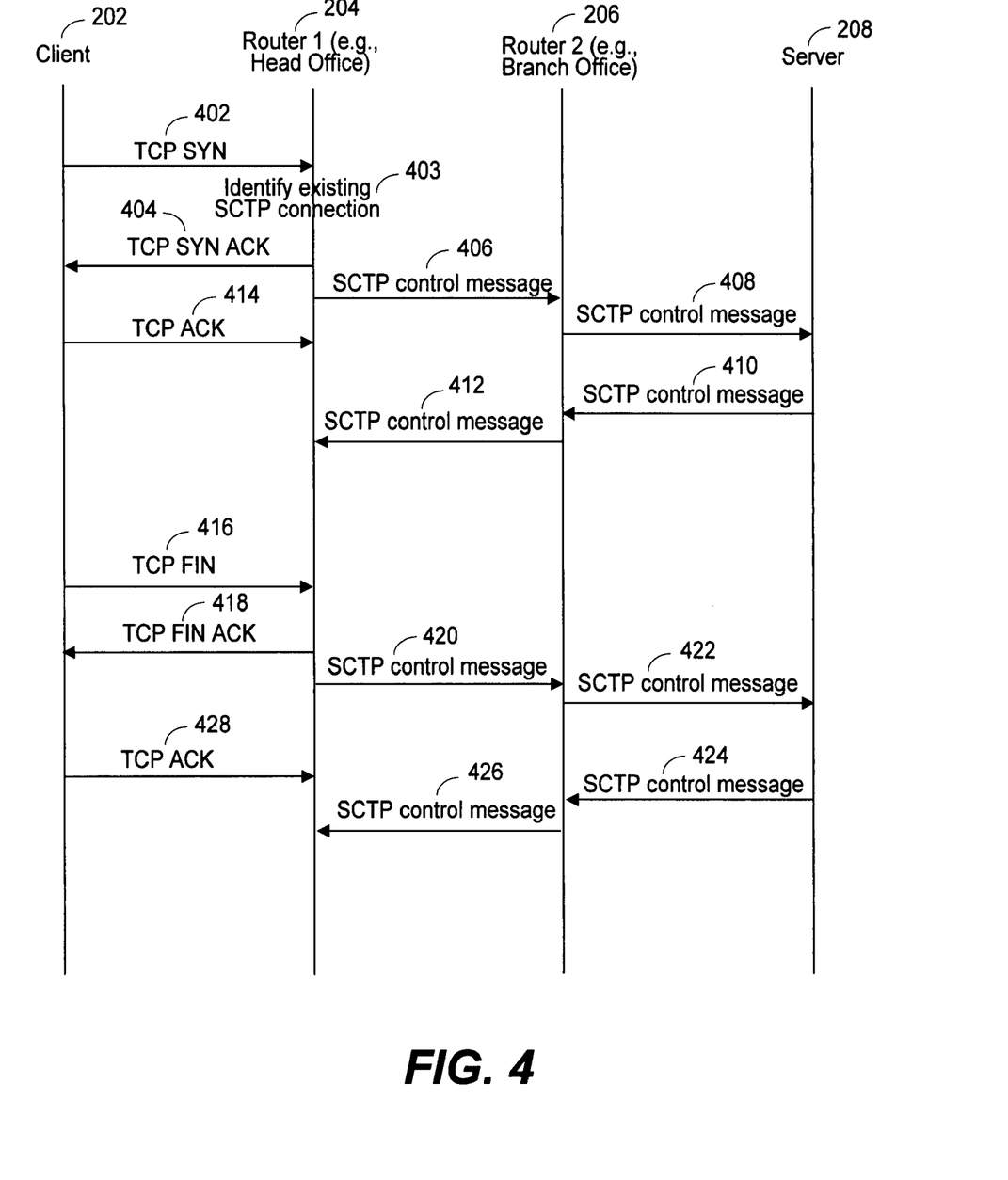
FIG. 4 is a transaction flow diagram illustrating an example method of establishing a TCP connection in association with an existing SCTP connection.

In accordance with one embodiment, a TCP connection is associated with an existing SCTP connection. FIG. 4 is a transaction flow diagram illustrating an example method of establishing a TCP connection in association with an existing SCTP connection. When the client 202 sends a TCP SYN packet at 402 to the first router 204, the first router 204 identifies an existing SCTP connection at 403. Assuming that an existing SCTP connection exists that may be used to transmit packets to the server 208, the first router 204 may send a TCP SYN ACK packet at 404 to the client 202 without waiting for an SCTP stream to be set up (e.g., without waiting for a response from the server 208). In other words, the TCP connection may be established without waiting for the SCTP stream to be established.

The first router 204 may continue to set up the SCTP stream by sending an SCTP control message identifying the SCTP connection at 406 to the second router 206. The SCTP control message may identify a client IP address, a client port, a server IP address, and a server port. The second router 206 may send the SCTP control message at 408 to the server 208. The server 208 may then respond by sending an SCTP control message at 410 to the second router 206, which sends the SCTP control message to the first router 204 at 412. As shown at 414, the client 202 may respond to the TCP SYN ACK packet by sending a TCP ACK. It is important to note that since the TCP ACK is received by the first router 404, the TCP connection may be established before the SCTP stream is set up (e.g., before a response to the SCTP control message is received from the server 208). As a result, the client 202 may immediately start sending packets to the first router 204, as will be described in further detail below with reference to FIG. 5.

Similarly when the client 202 sends a TCP FIN packet at 416 to the first router 204 to discontinue the TCP session, the first router 204 may immediately send a TCP FIN ACK packet at 418 to the client 202. In order to end the SCTP session associated with the corresponding SCTP stream, the first router 204 may send an SCTP control message at 420 to the second router 206, which may send the SCTP control message to the server 208 at 422. Similarly, the server 208 may send an SCTP control message at 424 to the second router 206, which may then send the SCTP control message at 426 to the first router 204. Since the TCP ACK 428 may be received by the first router 204 before the SCTP session is ended, valuable resources may be released. Moreover, the TCP session may be ended before the sequence of SCTP handshake messages are completed.

Figure 5:
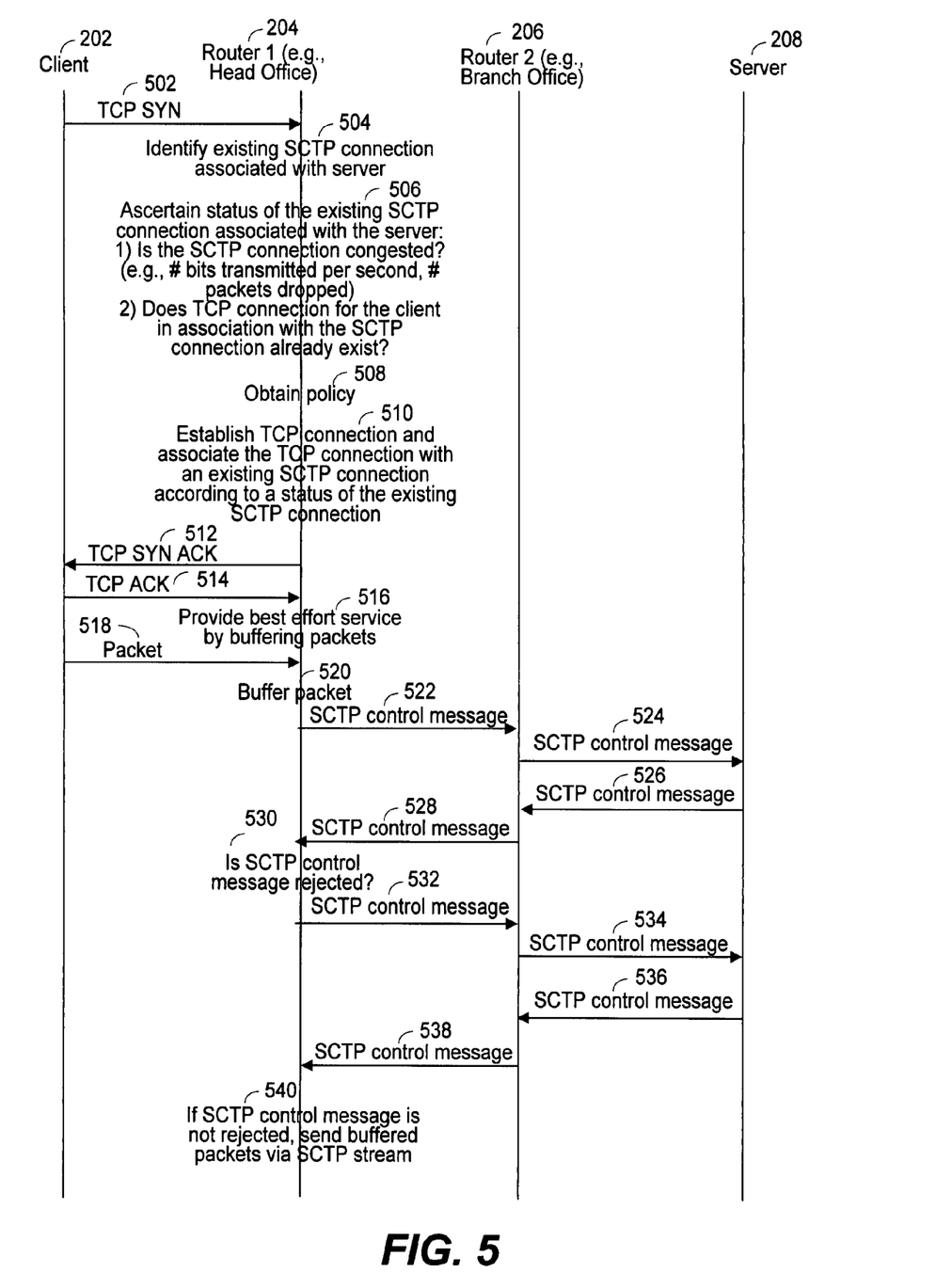
FIG. 5 is a transaction flow diagram illustrating a detailed example method of establishing a TCP connection in association with an existing SCTP connection.

FIG. 5 is a transaction flow diagram illustrating a detailed example method of establishing a TCP connection in association with an existing SCTP connection. When the client 202 sends a TCP SYN packet addressed to a server at 502 to the first router 204, the first router 204 may identify an existing SCTP connection associated with the server 208 at 504. More particularly, a destination IP address and destination port may be identified from an IP packet header associated with the TCP SYN packet. The first router 204 may then search a table such as that described below with reference to FIG. 6 to identify an existing SCTP connection associated with the destination IP address and the destination port.

Once the first router 204 identifies an existing SCTP connection associated with the server 208, the first router 204 may determine the status of the existing SCTP connection that is associated with the server at 506. More particularly, the status may indicate that the existing SCTP connection is congested. For instance, the first router 204 may obtain information associated with the existing SCTP connection such as the number of bits transmitted per second and/or the number of packets that are dropped. The status may also indicate that a TCP connection already exists for the client in association with the existing SCTP connection. In other words, the client may be a rogue client.

The first router 204 may ascertain whether a client is a rogue client by identifying a source IP address and source port from the TCP SYN packet it has received from the client 202. The combination of the source IP address and the source port smay be unique for each TCP connection. Thus, the first router 204 may determine the status of the existing SCTP connection associated with the server by ascertaining whether a TCP connection already exists for the source IP address and the source port, wherein the TCP connection is associated with the existing SCTP connection associated with the server. For instance, the first router 204 may search a table such as that described below with reference to FIG. 6. If the first router 204 determines that a TCP connection associated with the client has already been established and associated with an existing SCTP connection, the first router 204 may conclude that the client 202 is a rogue client.

If the first router 204 determines that the client is a rogue client or the existing SCTP connection associated with the server is congested, the first router 204 may refuse to establish the TCP connection with the client in such instances. If the first router 204 does not establish the TCP connection, the first router 204 may send a response to the client indicating that the TCP connection is not being established (not shown).

Even if the status indicates that the existing SCTP connection is congested, it may still be desirable to establish the TCP connection. More particularly, a policy 508 may indicate the desired behavior when the existing SCTP connection is congested. For instance, the policy 508 may indicate that packets that are transmitted via the existing SCTP connection be compressed when the SCTP connection is congested. Alternatively, the policy 508 may dictate that the first router 204 reject the attempt to establish a TCP connection if the SCTP connection is congested. Of course, a policy 508 may indicate that packets are to be compressed, even if the existing SCTP connection is not congested.

A TCP connection may be established and associated with the existing SCTP connection according to a status of the SCTP connection at 510. More particularly, the first router 204 may refuse to establish the TCP connection and therefore not send an SCTP control packet to the server 208. Alternatively, assuming that an existing SCTP connection exists that may be used to transmit packets to the server 208 and that the status of the existing SCTP connection indicates that it is desirable to establish the TCP connection, a TCP connection may be established between the first router 204 and the client 202. Thus, the first router 204 may send a TCP SYN ACK packet at 512 to the client 202 without waiting for an SCTP stream corresponding to the SCTP connection to be established. By sending the TCP SYN ACK packet to the client 202, the first router 204 may notify the client 202 that the TCP connection is established. The client 202 may then respond by sending a TCP ACK packet at 514 to the first router 204 to acknowledge its receipt of the TCP SYN ACK packet.

The first router 204 may associate the TCP connection with the existing SCTP connection. More particularly, the first router 204 may store information identifying the client such that the information identifying the client is associated with the existing SCTP connection. For instance, the first router 204 may update a table such as that described below with reference to FIG. 6. More particularly, the first router 204 may obtain the source IP address and source port associated with the client from the TCP SYN packet. The first router 204 may then associate the source IP address and source port with an SCTP stream. For example, the first router 204 may establish an SCTP stream and corresponding stream number automatically upon receiving the TCP SYN or, alternatively, during configuration of the client before TCP connections arrive.

Upon establishing the TCP connection, the first router 204 may provide best effort service to the client 202 at 516. More particularly, until a response to an SCTP control message is received from the server is successfully acknowledged, the first router 204 may buffer packets received from the client. For example, as shown at 518, when the client 202 sends a packet, the first router 204 may buffer the packet at 520.

In addition, the first router 204 may associate the TCP connection with the existing SCTP connection. More particularly, since a single SCTP connection may have a plurality of streams associated therewith, the existing SCTP connection may be associated with multiple TCP connections. This may be accomplished via a table such as that described below with reference to FIG. 6.

The first router 204 may continue to set up an SCTP stream associated with the existing SCTP connection by sending an SCTP control message at 522 to the second router 206. The second router 206 may send the SCTP control message at 524 to the server 208. The server 208 may respond by sending an SCTP control message at 526 to the second router 206, which may then send the SCTP control message to the first router 204 at 528.

Upon receiving the SCTP control message from the server 208, the first router 204 may determine whether the server 208 has rejected the SCTP control message that has been sent to the server 208 at 530. If the server 208 has rejected the SCTP control message that was previously sent to it, the first router 204 may send another SCTP control message to the server 208 at 532, which may then be forwarded to the server 208 at 534. The server 208 may then respond by sending an SCTP control message at 536 to the second router 206. The second router 206 may then forward the SCTP control message to the first router 204 at 538. If the first router 204 has determined that the server 208 has not rejected the SCTP control message, the SCTP stream may be successfully established.

Once an SCTP control message transmitted by the first router 204 is successfully acknowledged (enabling the SCTP stream to be established), the first router 204 may send any buffered packets to the server 208 via the associated SCTP stream at 540. In addition, the first router 204 may associate the TCP connection with one of a plurality of streams associated with the existing SCTP connection. This may be accomplished by providing the stream number in a table such as that described below with reference to FIG. 6.

Figure 6:
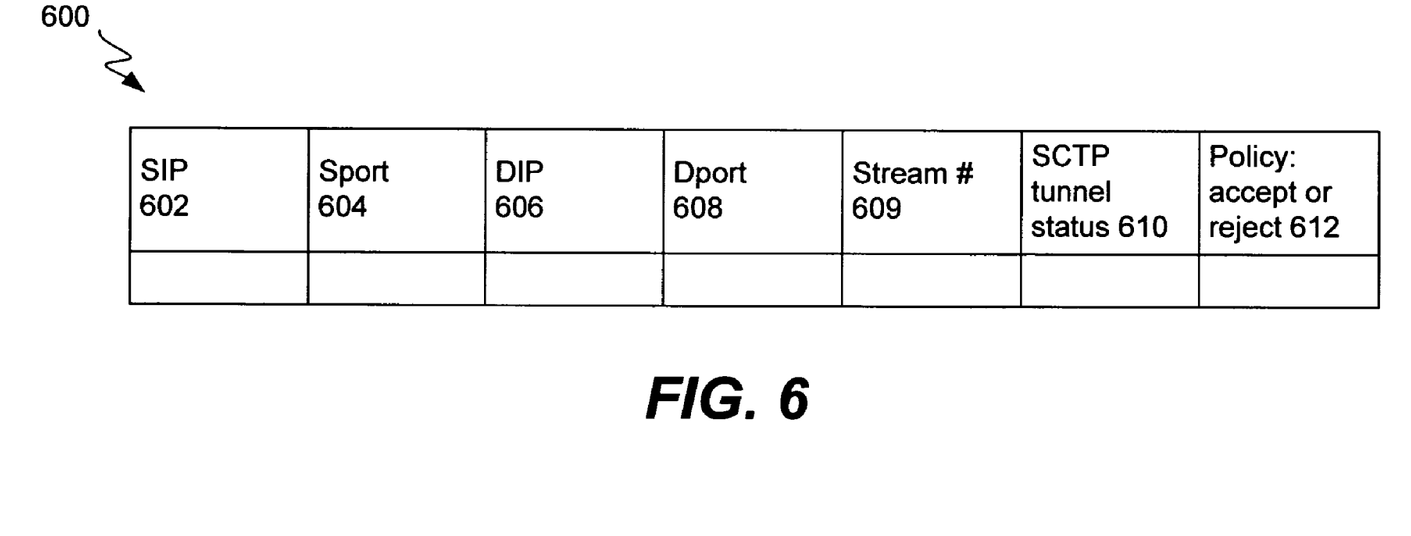
FIG. 6 is a diagram illustrating example information that may be stored in association with each TCP connection associated with an SCTP stream

FIG. 6 is a diagram illustrating example information that may be stored in association with each TCP connection associated with an SCTP stream. Table 600 may identify a plurality of SCTP connections and TCP connections associated with each of the SCTP connections. More particularly, each SCTP connection may have a plurality of SCTP streams associated therewith. Each of the TCP connections may therefore be associated with an SCTP connection and one of the corresponding plurality of SCTP streams. Moreover, a TCP connection may be associated with a client. For instance, the client may be identified by a source IP address (SIP) 602 and a source port (Sport) 604. An SCTP connection may be associated with a server. As set forth above, a server and therefore an SCTP connection may be identified by a destination IP address (DIP) 606 and a destination port (Dport) 608. A stream number 609 may identify an SCTP stream associated with a particular SCTP connection. Each entry associated with an SCTP connection may indicate a status 610 of the SCTP connection. For instance, the status 610 may indicate whether the SCTP connection is congested by indicating information such as the number of bits transmitted per second and/or the number of packets that are dropped by the SCTP connection. A corresponding policy 612 may indicate whether packets associated with the TCP connection and corresponding SCTP connection are to be rejected or accepted.

Although FIGS. 4-6 relate to establishing a TCP connection in association with an existing SCTP connection, it is important to note that a network connection in a first protocol may be associated with an existing network connection in a second protocol. The two protocols that are used may be a variety of protocols. In order to leverage the existing network connection to eliminate unnecessary network delays, the network connection in the first protocol may be established before a stream associated with the network connection in the second protocol is successfully established.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention may be implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. Further, the invention may be at least partially implemented on a card (e.g., an interface card) for a network device or a general-purpose computing device.

Figure 7:
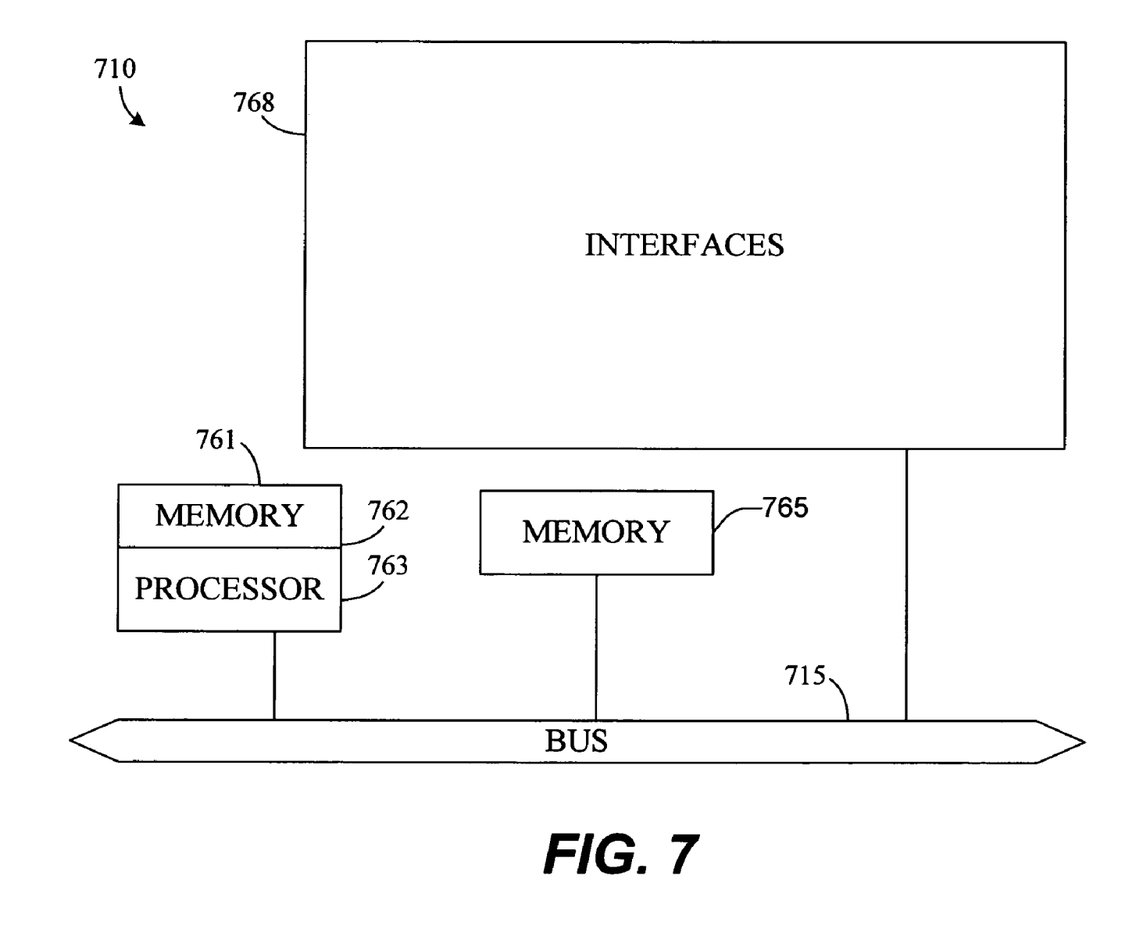
FIG. 7 is a diagrammatic representation of a router in which various embodiments may be implemented.

Referring now to FIG. 7, a router 710 suitable for implementing embodiments of the invention includes a master central processing unit (CPU) 762, interfaces 768, and a bus 715 (e.g., a PCI bus). When acting under the control of appropriate software or firmware, the CPU 762 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 62 may include one or more processors 763 such as a processor from the Motorola family of microprocessors or the MIPS family of microprocessors. In an alternative embodiment, processor 763 is specially designed hardware for controlling the operations of router 10. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets or data segments over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, LAN interfaces, WAN interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

Although the system shown in FIG. 7 is one specific router of the present invention, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 765) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The disclosed embodiments may also be embodied in a carrier wave travelling over an appropriate medium such as optical lines, electric lines, etc. Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. For instance, although the example embodiments are described with reference to the TCP and SCTP protocols, these protocols are merely illustrative and therefore the disclosed embodiments may be implemented using other protocols. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
   receiving by an apparatus a control message in a first protocol from a client, the control message in the first protocol being addressed to a destination IP address identifying a network device;
   identifying by the apparatus an existing connection in a second protocol that is associated with the destination IP address of the network device;
   sending by the apparatus a control message in the second protocol to the network device;

sending by the apparatus an acknowledgement of the control message in the first protocol to the client such that a connection in the first protocol is established between the apparatus and the client, wherein the acknowledgement to the control message in the first protocol is sent to the client without waiting for a response to the control message in the second protocol from the network device; and associating by the apparatus the connection in the first protocol with the existing connection in the second protocol.

2. The method as recited in claim 1, wherein associating by the apparatus the connection in the first protocol with the existing connection in the second protocol comprises:

storing by the apparatus information identifying the client such that the information identifying the client is associated with the existing connection in the second protocol.

3. The method as recited in claim 1, wherein associating by the apparatus the connection in the first protocol with the existing connection in the second protocol is performed before a response to the control message in the second protocol is received by the apparatus from the network device.

4. The method as recited in claim 1, further comprising:

buffering by the apparatus packets received from the client until a response to the control message in the second protocol previously sent by the apparatus to the network device is successfully acknowledged by the network device.

5. The method as recited in claim 1, further comprising:

notifying the client that the connection in the first protocol is established;

wherein the connection in the first protocol is established and associated with the existing connection in the second protocol such that the existing connection in the second protocol is associated with multiple connections in the first protocol before a response to the control message in the second protocol is received by the apparatus from the network device.

6. The method as recited in claim 1, wherein the first protocol is Transmission Control Protocol (TCP) and the second protocol is Stream Control Transmission Protocol (SCTP), wherein sending by the apparatus an acknowledgement of the control message in the first protocol to the client is performed without waiting for a SCTP stream to be established.

7. The method as recited in claim 1, further comprising:

determining a status of the existing connection in the second protocol; and compressing packets that are transmitted in association with the existing connection in the second protocol when the status indicates that the existing connection in the second protocol is congested.

8. The method as recited in claim 1, wherein sending by the apparatus an acknowledgement of the control message in the first protocol to the client is performed before sending by the apparatus a control message in the second protocol to the network device.

9. The method as recited in claim 1, further comprising:

receiving by the apparatus a second control message from the client in the first protocol, wherein the second control message indicates a request to discontinue the connection in the first protocol;

tearing down by the apparatus the connection in the first protocol between the apparatus and the client;

wherein tearing down the connection in the first protocol between the apparatus and the client is performed before a sequence of handshake messages in the first protocol are completed.

10. The method as recited in claim 1, wherein the existing connection in the second protocol is between the network device and a second network device, wherein the second network device is not the client.

11. The method as recited in claim 1, further comprising:

ensuring that the existing connection in the second protocol is not between the network device and the client.

12. An apparatus, comprising:

a processor; and a memory, at least one of the processor or the memory being adapted for:

receiving by an apparatus a control message in a first protocol from a client, the control message in the first protocol being addressed to a network device;

identifying by the apparatus an existing connection in a second protocol that is between the network device and another device that is not the client;

sending by the apparatus a control message in the second protocol to the network device;

sending by the apparatus an acknowledgement of the control message in the first protocol to the client, thereby establishing a connection in the first protocol between the apparatus and the client, and associating by the apparatus the connection in the first protocol with the existing connection in the second protocol;

wherein sending by the apparatus the acknowledgement of the control message in the first protocol to the client is performed without waiting for a response to the control message in the second protocol from the network device such that the acknowledgement to the control message in the first protocol is sent to the client prior to receiving a response to the control message in the second protocol from the network device.

13. The apparatus as recited in claim 12, wherein when the existing connection in the second protocol is congested, packets that are transmitted via the connection in the second protocol are to be compressed prior to their transmission.

14. An apparatus, comprising:

means for receiving by the apparatus a control message in a first protocol from a client, the control message in the first protocol being addressed to a network device;

means for identifying by the apparatus a source IP address and a destination IP address from the control message in the first protocol that is received from the client; and means for searching by the apparatus a table identifying a plurality of connections in the second protocol for an existing connection in the second protocol that is associated with the destination IP address;

means for ascertain whether a connection in the second protocol already exists between the source IP address and the destination IP address; and means for establishing by the apparatus a connection in the first protocol between the apparatus and the client and associating by the apparatus the connection in the first protocol with the existing connection in the second protocol, wherein establishing and associating are performed according to whether a connection in the second protocol already exists between the source IP address and the destination IP address.

15. The apparatus as recited in claim 14, further comprising:

means for determining by the apparatus whether the existing connection in the second protocol is congested; and means for associating by the apparatus the connection in the first protocol with the existing connection in the second protocol;

means for sending by the apparatus a control message in the second protocol to the network device if the existing connection in the second protocol is not congested; and means for sending by the apparatus an acknowledgement of the control message in the first protocol to the client if the existing connection in the second protocol is not congested.

16. An apparatus, comprising:

a processor; and a memory, at least one of the processor or the memory being adapted for:

receiving by the apparatus a control message in a first protocol from a client, the control message in the first protocol being addressed to a network device;

identifying by the apparatus a source IP address and a destination IP address from the control message in the first protocol that is received from the client;

searching by the apparatus a table identifying a plurality of connections in the second protocol for an existing connection in the second protocol that is associated with the destination IP address;

ascertaining whether a connection in the second protocol already exists between the source IP address and the destination IP address; and establishing by the apparatus a connection in the first protocol between the apparatus and the client and associating by the apparatus the connection in the first protocol with the existing connection in the second protocol, wherein establishing and associating are performed according to whether a connection in the second protocol already exists between the source IP address and the destination IP address.

17. The apparatus as recited in claim 16, at least one of the processor or the memory being further adapted for:

sending by the apparatus a response to the control message in the first protocol to the client to indicate that the connection in the first protocol is not being established.

18. The apparatus as recited in claim 16, wherein when the existing connection in the second protocol is congested, the connection in the first protocol is not established between the apparatus and the client.

19. The apparatus as recited in claim 16, wherein the first protocol is Transmission Control Protocol (TCP) and the second protocol is Stream Control Transmission Protocol (SCTP).

* * * * *